April 18, 1939.  C. STEENSTRUP  2,155,284

RACK FOR REFRIGERATOR CABINETS

Filed Aug. 24, 1934  2 Sheets-Sheet 1

Inventor:
Christian Steenstrup.
by Harry E. Dunham
His Attorney

Patented Apr. 18, 1939

2,155,284

UNITED STATES PATENT OFFICE 2,155,284

RACK FOR REFRIGERATOR CABINETS

Christian Steenstrup, Schenectady, N. Y., assignor to General Electric Company, a corporation of New York Application August 24, 1934, Serial No. 741,247

15 Claims. (Cl. 62—89)

My invention relates to racks for refrigerator cabinets of the type having a door at the top thereof.

It is an object of my invention to provide a rack for refrigerator cabinets of the type having a door at the top, so arranged that articles supported at different heights within the cabinet, will all be readily accessible, and permit free circulation of air about the articles and within the cabinet.

Further objects and advantages of my invention will become apparent as the following description proceeds, and the features of novelty which characterize my invention will be pointed out in the claims annexed to and forming a part of this specification.

Figure 1:
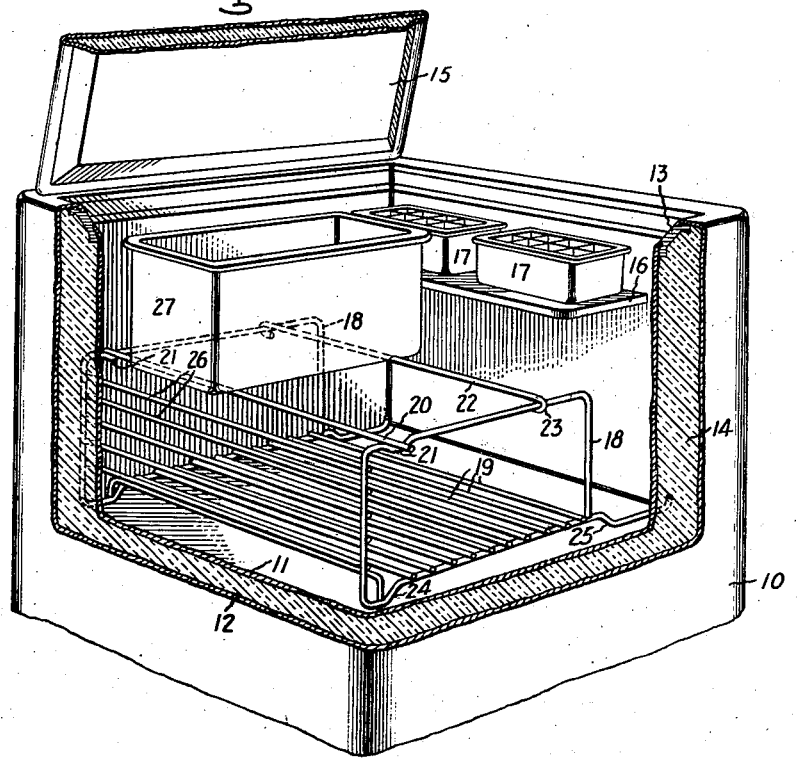
Figure 2:
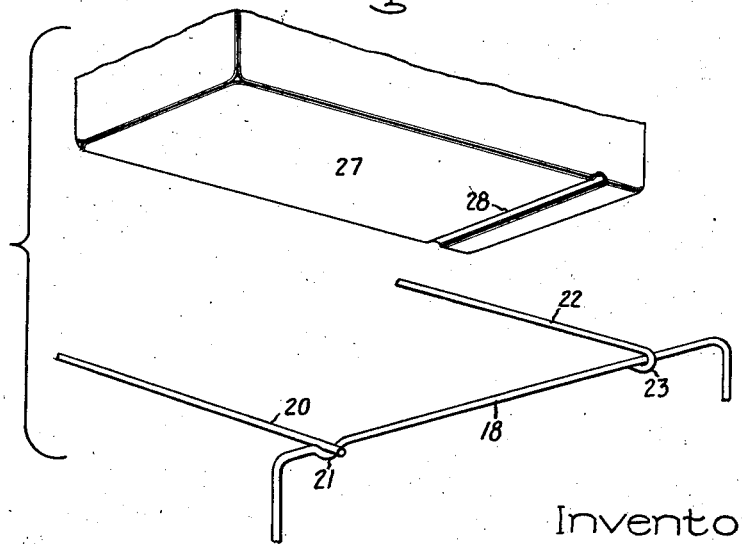

For a better understanding of my invention reference may be had to the accompanying drawings in which Fig. 1 is a perspective view of the upper portion of a refrigerator cabinet partly broken away and provided with a rack embodying my invention; Fig. 2 is a detailed perspective view of the food pan and supporting guides shown in Fig. 1, and Fig. 3 is a perspective view of the upper portion of a refrigerator cabinet broken away and provided with a rack embodying a modification of my invention, one food container being shown in a raised position, as if being held above the cabinet.

In accordance with my invention I provide a rack which may be fitted with a grill for supporting articles at a slight distance above the bottom of the cabinet to permit circulation of air and which includes horizontal guides on which food containers may be supported above articles placed in the bottom of the cabinet, the food containers being removable and being slidable on the guides in order to afford access to any desired part of the lower portion of the cabinet.

Referring now to the drawings, one embodiment of my invention shown in Fig. 1 includes a refrigerator cabinet 10 comprising inner and outer walls 11 and 12 respectively spaced apart and secured together about the door opening by a heat insulating strip 13, the space between the walls being filled with heat insulation 14. A door 15 is provided to close the top of the cabinet. The cabinet is cooled by an evaporator including a horizontal shelf 16 in the upper portion thereof. The shelf 16 is maintained sufficiently cold for freezing purposes and water, desserts, or other comestibles placed in trays 17 may be frozen thereon. Within the cabinet and resting on the bottom thereof I provide a rack comprising a pair of vertically arranged rectangular side frames 18 each formed from a single piece of heavy wire or the like secured together at the bottom by a plurality of bars 19 forming a grill and at the top by a bar 20 welded in vertical loops 21 to the top sides of the frame 18, and a bar 22 provided with hooks 23 engaging the upper sides of the frames. The side frames 18 extend from the side of the cabinet opposite the shelf 16 up to a point just below the shelf 16. The bar 22 may be removed by bending the frames toward each other to release the hooks 23. The lower side of each of the frames 18 is bent so as to provide a leg 24 at one side and a leg 25 at the other side extending from the frame 18 directly under the freezing shelf 16 which legs maintain the grill formed by the bars 19 a slight distance above the bottom of the cabinet and afford circulation of air between the grill and the cabinet. A plurality of bars 26 are secured to the sides of the frames 18 adjacent the wall of the refrigerator cabinet at the side remote from the freezing shelf to form a grill and insure circulation of air up the side and about articles of food placed on the grill 19. One or more food containers 27 may be placed within the cabinet and supported on the guides 20 and 22 in order more efficiently to utilize the space within the cabinet. It will thus be apparent that articles of food may be placed upon the grill 19 to fill the space below the level of the guides 22 and that food may also be placed in the container 27 in the remaining space in the cabinet. Articles such as milk bottles having a height greater than that of the guides 22 may be placed directly under the freezing shelf 16, or they may be placed on the grill 19, if one of the food containers is removed. As shown in Fig. 2 the container 27 is provided with a recess or groove 28 which engages the bar or guide 22 and positions the container on the guides. Should it be desired to use the cabinet without the container 27, the bar 22 may be removed so as not to obstruct the space above the grill 19. The entire rack may readily be removed as a unit whenever it is desired to do so in order to clean the cabinet or for any other reason, the interior cabinet walls being smooth and easily cleaned.

Figure 3:
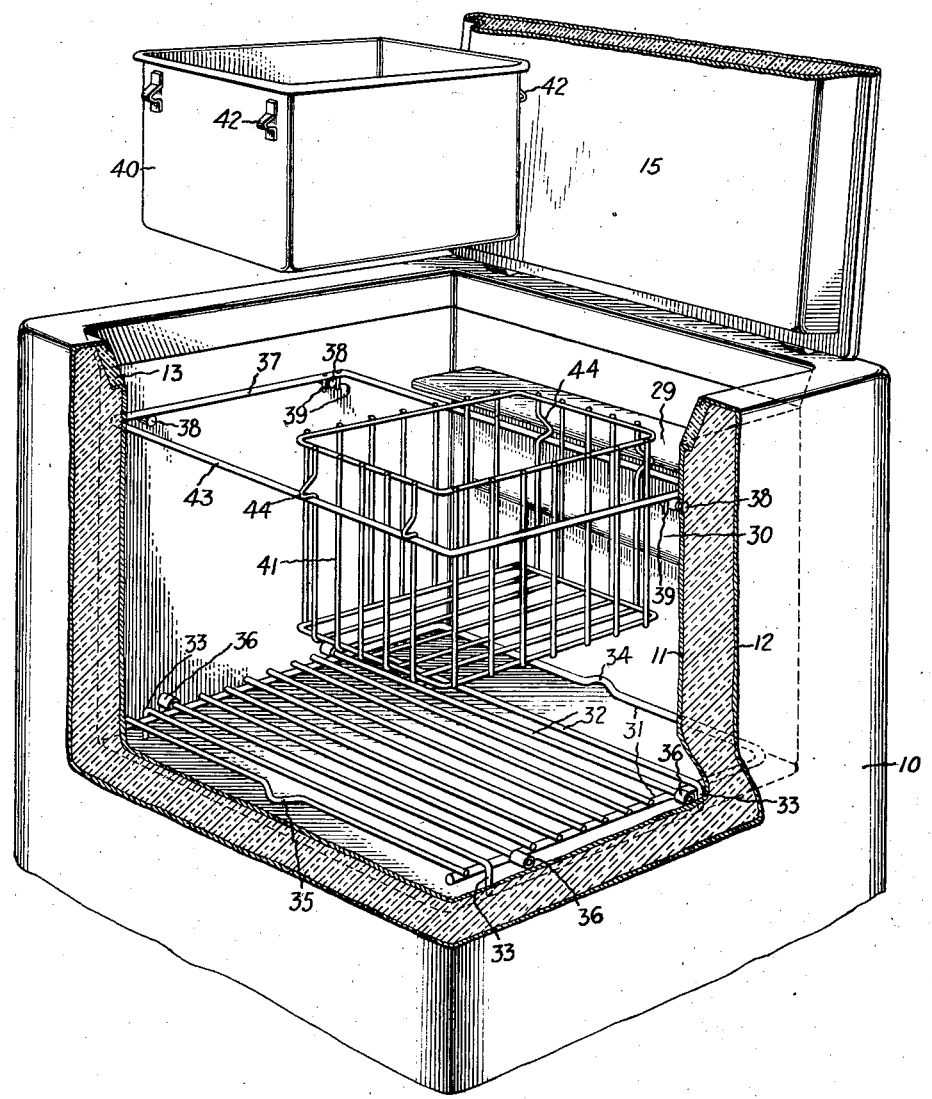

In Fig. 3 I have shown a refrigerator cabinet provided with a rack embodying a preferred modified form of my invention. The several parts of the refrigerator cabinet have been given the same numerals as those used in designating the parts of the cabinet shown in Fig. 1. The evaporator within the cabinet 10 shown in Fig.

3 is of inverted L-shaped form and comprises a horizontal air cooling and freezing shelf portion 29 and a vertical air cooling portion 30.

In this embodiment of my invention, instead of employing a unitary rack I provide a grill 32 for the bottom of the cabinet and a separate removable frame 37 mounted on pins 38 secured to the cabinet wall for supporting the food containers at the desired height.

The lower rack or grill comprises a U-shaped frame 31 having a plurality of parallel bars 32 welded or otherwise suitably secured thereto. Two of the bars have downwardly extended portions 33 at their ends bent downwardly to form legs for supporting the rack above the surface of the bottom of the cabinet. The frame 31 is provided with a horizontal loop 34 in the midportion thereof which engages one wall of the cabinet, and the outside bar 32 connecting the sides of the U is provided with a horizontal loop 35 which engages the opposite wall of the refrigerator cabinet. These two loops serve to hold the rack in place in the cabinet, and prevent the rack's moving in a direction transversely of the bars 32. In order to hold the rack securely in position, I provide bushings 36 or the like of rubber, or other suitable resilient material, secured at both ends of two of the bars 32 and which engage the walls of the cabinet and retain the rack firmly in position, and yet permit its ready removal through the top of the cabinet when desired.

In order to support food containers within the cabinet, I provide a rectangular frame 37 supported between the walls of the cabinet on pins 38 which may be riveted or otherwise suitably secured to the inner liner 11 of the cabinet. In order to prevent slipping of the rack 37 on the pins 38, I provide pins 39 secured to the rack and which engage the two of the pins 38 adjacent the shelf 29. Food containers such as a vegetable pan 40 and a wire basket 41 may be removably supported on the rack 37. The pan 40 is provided at both ends with brackets 42 arranged to engage the sides 43 of the rack 37 and hold the pan at its proper height, and the basket 41 is provided with loops 44 for the same purpose. It is apparent, therefore, that either of the food containers may be removed and that when one of them is removed the other may be slid along the bars 43 which act as guides for the food container and in this way articles placed on the grill bars 32 may easily be reached. The bars 43 thus provide two longitudinal side rails, one adjacent the edge of the shelf-type cooling unit 16, and the other adjacent the opposite wall of the cooling compartment. When it is not desired to use the food containers, the frame 37 may also be removed, so as to make the grill 32 more accessible.

From the foregoing it is apparent that I have provided a simple easily constructed arrangement for supporting articles within a cabinet of the type having a door at the top thereof which will afford ready access to articles of food within the cabinet at all times, and which may easily be removed for the purpose of cleaning.

While I have disclosed particular forms of my invention, I do not desire my invention to be limited to the specific embodiments shown and described, and I intend in the appended claims to cover all modifications within the spirit and scope of my invention.

What I claim as new and desire to secure by Letters Patent of the United States is:

1. A rack for refrigerator cabinets or the like comprising a pair of rectangular side frames, means including a pair of parallel horizontal guides for connecting said side frames at the top thereof, and a food container slidably supported on said guides.

2. A refrigerator cabinet or the like of the type having side and bottom walls and a food compartment having a door at the top thereof, a supporting rack within said food compartment comprising a pair of rectangular side frames, means including a plurality of bars forming a grill for connecting said side frames at the lower portions thereof, means including a pair of parallel horizontal guides for connecting said side frames at the top thereof, and a food container slidably supported on said guides.

3. A rack for refrigerator cabinets or the like comprising a pair of rectangular side frames, means including a pair of parallel horizontal guides for connecting said side frames at the top thereof, means including a grill for connecting said frames at the lower portions thereof, and a food container slidably supported on said guides.

4. A refrigerator cabinet or the like of the type having side and bottom walls and a food compartment having a door at the top thereof, a supporting rack within said food compartment comprising rectangular side frames, means including a plurality of parallel bars forming a grill for connecting said frames at the lower portions thereof, means including a pair of parallel horizontal guides for connecting said frames at the upper portions thereof, and a food container slidably supported on said guides, said side frames being formed to support said bars above the bottom of the cabinet to afford circulation of air below articles placed on said grill.

5. A refrigerator cabinet or the like of the type having side and bottom walls and a food compartment having a door at the top thereof, a supporting rack within said food compartment comprising rectangular side frames, means including a pair of horizontal guides for connecting said frames at the upper portions thereof, a food container slidably supported on said guides, and means including a recess in the bottom of said container for positioning said container on said guides.

6. A refrigerator cabinet or the like of the type having side and bottom walls and a food compartment having a door at the top thereof, a supporting rack within said food compartment comprising rectangular side frames, means including a plurality of parallel bars forming a grill for connecting said side frames at the lower portions thereof, means including a pair of parallel horizontal guides for connecting said side frames at the upper portions thereof, a food container slidably supported on said guides, and means including a recess in the bottom of said container for positioning said container on said guides.

7. A refrigerator cabinet or the like of the type having side and bottom walls and a food compartment having a door at the top thereof, a supporting rack within said food compartment comprising rectangular side frames, means including a plurality of parallel bars forming a grill for connecting said frames at the lower portions thereof, means including a pair of parallel horizontal guides for connecting said frames at the upper portions thereof, and a food container slidably supported on said guides, one of said guides being rigidly secured to said frames and the other of said guides being readily detachable therefrom.

8. A rack for refrigerator cabinets or the like comprising rectangular side frames, means including a plurality of parallel bars forming a grill for connecting said frames at the lower portions thereof, means including a pair of horizontal guides for connecting said side frames at the upper portions thereof, and a food container slidably supported on said guides, one of said guides being rigidly secured to said frames and the other of said guides being readily detachable therefrom.

9. A refrigerator cabinet or the like of the type having side and bottom walls and a food compartment having a door at the top thereof, an article support comprising a frame and a plurality of bars secured to said frame and forming a grill, at least one lateral side of said frame having a lateral extension formed thereon to prevent horizontal lateral displacement of said grill within said cabinet, means including supporting legs formed by downwardly bent end portions of at least a part of said bars supporting said grille above the bottom of said food compartment for affording circulation of air below articles supported thereon, means including longitudinal extensions on a plurality of said bars and resilient bushings or the like secured on said extensions for preventing longitudinal horizontal movement of said grill within said cabinet.

10. In combination with a refrigerator cabinet or the like of the type having side and bottom walls and a food compartment having an opening at the top thereof, a door for said opening, the interior walls of said food compartment presenting smooth easily cleaned surfaces, means removable from said compartment through said opening at the top thereof for supporting articles within said compartment, said means comprising a rectangular frame substantially narrower than said food compartment, means for supporting said frame in said food compartment above the bottom thereof, a food container having side and bottom walls, means including projections formed on the side walls of said food container adjacent the upper edge thereof for slidably supporting said food container on said frame with the bottom wall of said food container above articles on the bottom of said food compartment.

11. In combination with a refrigerator cabinet or the like of the type having side and bottom walls and a food compartment having an opening at the top thereof, a door for said opening, the interior walls of said food compartment presenting smooth easily cleaned surfaces, a shelf type cooling unit projecting into said compartment from one of said side walls directly below said door, means removable from said compartment through said opening at the top thereof for supporting articles within said compartment, said means comprising a rectangular frame including a pair of longitudinal side rails, one of said side rails being arranged adjacent the edge of said shelf type cooling unit and the other of said side rails being arranged adjacent the opposite side wall of said compartment, means for supporting said frame in said compartment above the bottom thereof, a food container having side and bottom walls, means including projections formed on the side walls of said food container adjacent the upper edge thereof for slidably supporting said food container on said side rails of said frame with the bottom wall of said food container above articles on the bottom of said compartment.

12. In combination with a refrigerator cabinet or the like of the type having side and bottom walls and a food compartment having an opening at the top thereof, a door for said opening, the interior walls of said food compartment presenting smooth easily cleaned surfaces, means removable from said compartment through said opening at the top thereof for supporting articles within said compartment, said means comprising a rectangular frame substantially narrower than said food compartment, means for supporting said frame in said compartment above the bottom thereof, a food container of open wirework construction, the sides of said food container including vertical bars arranged in spaced relation, means including lateral bends formed in the upper portions of a plurality of said vertical bars for slidably supporting said food container on said frame with the bottom wall of said food container above articles on the bottom of said compartment.

13. In combination with a refrigerator cabinet or the like of the type having side and bottom walls and a food compartment having an opening at the top thereof, a door for said opening, the interior walls of said food compartment presenting smooth easily cleaned surfaces, means removable from said compartment through said opening at the top thereof for supporting articles within said compartment at a plurality of vertical levels, said means comprising a grill or the like for supporting articles near and spaced from the bottom wall of said food compartment and for providing circulation of air between the articles at the bottom of said food compartment and the bottom wall thereof, a food container, and a pair of parallel guides arranged above said grill presenting unobstructed supporting surfaces directly below said door, said food container being slidably supporting on said guides above articles placed on said grill, said container being vertically removable from said guides and being slidable to either side of said cabinet to afford access to the articles on said grill.

14. In combination with a refrigerator cabinet or the like of the type having side and bottom walls and a food compartment having an opening at the top thereof, a door for said opening, the interior walls of said food compartment presenting smooth easily cleaned surfaces, means removable from said compartment through said opening at the top thereof for supporting articles within said compartment at a plurality of vertical levels, said means comprising a grill or the like for supporting articles near and spaced from the bottom wall of said food compartment and for providing circulation of air between the articles at the bottom of said food compartment and the bottom wall thereof, a plurality of food containers, and a pair of parallel guides arranged above said grill presenting unobstructed supporting surfaces directly below said door, said food containers being slidably supported in horizontal alignment on said guides above articles placed on said grill, said containers being vertically removable from said guides and being slidable along said guides when one of said containers is removed therefrom to afford access to articles on said grill.

15. In combination with a refrigerator cabinet or the like of the type having side and bottom walls and a food compartment having an opening at the top thereof, a door for said opening, the interior walls of said food compartment presenting smooth easily cleaned surfaces, means removable from said compartment through said opening at the top thereof for supporting articles within said compartment at a plurality of vertical levels, said means comprising a grill or the like for supporting articles near and spaced from the bottom wall of said food compartment and for providing circulation of air between the articles at the bottom of said food compartment and the bottom wall thereof, two food containers, and a pair of parallel guides arranged above said grill presenting unobstructed supporting surfaces directly below said door, said food containers being slidably supported in horizontal alignment above articles placed on said grill, either of said containers being vertically removable from said guides and being slidable on said guides to either side of said food compartment when the other of said containers is removed therefrom to afford access to articles on said grill.

CHRISTIAN STEENSTRUP.